Nov. 4, 1969     C. CAMOSSI     3,476,851

METHOD FOR MAKING VIBRATION DAMPENING AND SHOCK ABSORBING SUPPORT

Filed Dec. 13, 1965     2 Sheets-Sheet 1

INVENTOR
Carlo Camossi

BY

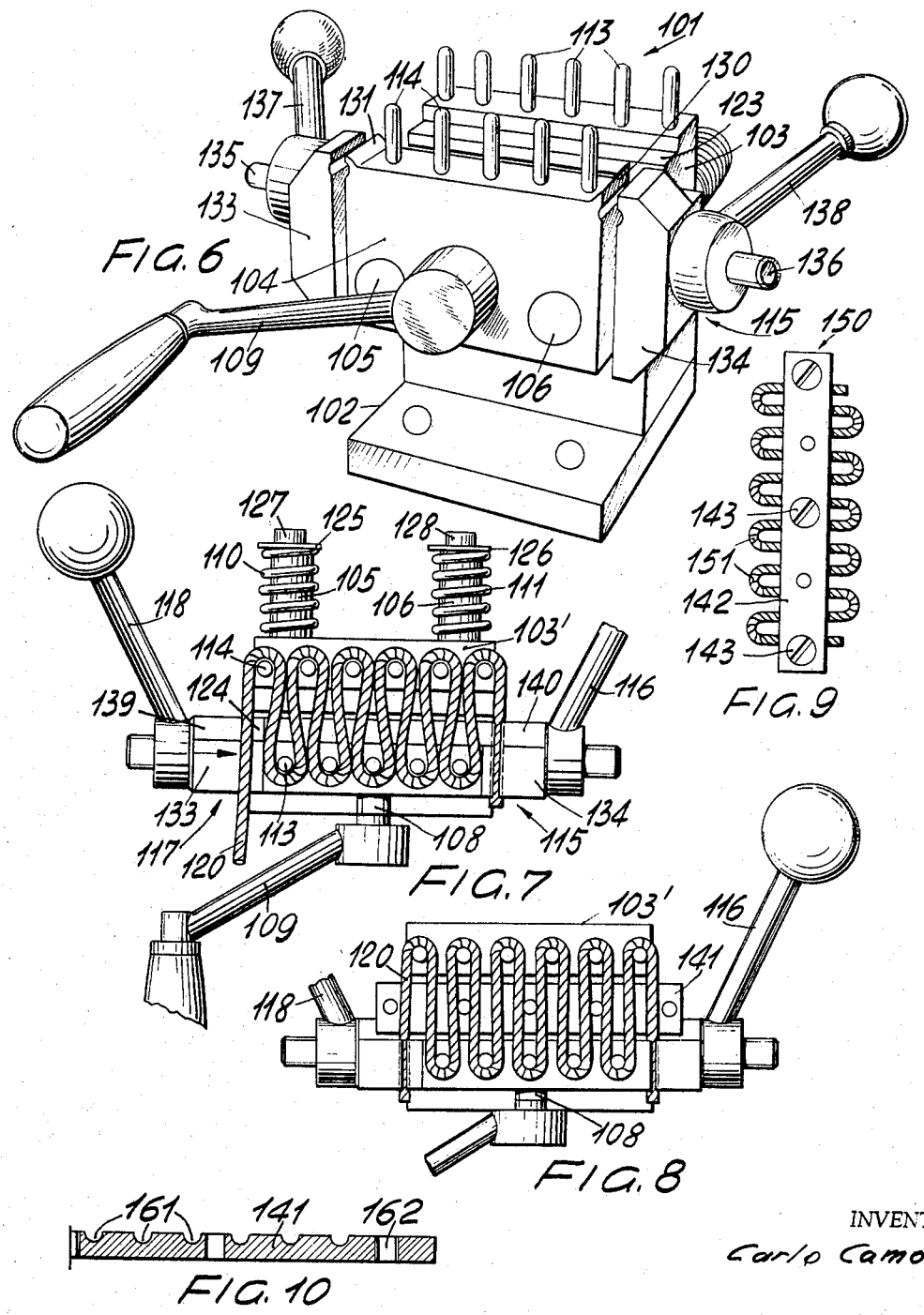

United States Patent Office 3,476,851
Patented Nov. 4, 1969

3,476,851
METHOD FOR MAKING VIBRATION DAMPENING AND SHOCK ABSORBING SUPPORT
Carlo Camossi, c/o Avv. Camillo Ravagli-Via Corridoni, 6, Milan, Italy
Filed Dec. 13, 1965, Ser. No. 513,406
Claims priority, application Italy, Dec. 21, 1964, 54,656; Jan. 14, 1965, 272; July 13, 1965, 6,832
Int. Cl. B32b *15/06;* B29f *1/10*
U.S. Cl. 264—229     2 Claims

ABSTRACT OF THE DISCLOSURE

A method for making vibration dampening and shock absorbing supports in which a fixture is provided for holding a wire cable taut in a zig-zag form so a clamp can be put on the cable whereupon the clamped cable can be removed from the fixture and blocks of synthetic resin molded on the exposed portions of the clamped cable.

---

Figures 1, 2, 3:
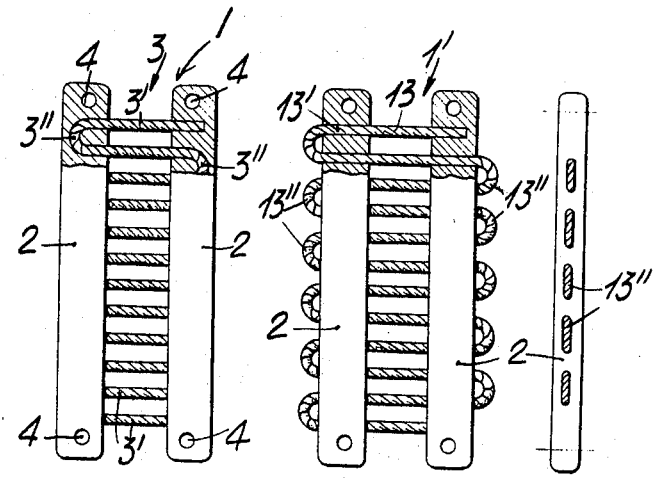

Rubber, metal, and rubber-metal vibration dampening supports have been known for a longtime, said supports accomplishing their damping function by utilizing the proper elasticity characteristics of rubber and/or springs or metal foils suitably arranged.

However, such supports are not heat and chemically resistant and do not absorb all vibrations. The present invention proposes a vibration dampening support in which vibrations at any angle are absorbed, together with shock loads, and which is heat and chemically resistant.

An object of the present invention is to provide a method of making a vibration dampening support that, unlike known supports, is capable of meeting all the above disclosed requirements, and having, in addition, further utilities and advantages that will be apparent from the following description.

The principle of the presently disclosed method of making the vibration dampening support, forming the object of the present invention, is based on the fact that, when a metal cable is subjected to deformation, a relative sliding arises therein between the individual filaments or wires making up the cable; in such a sliding a creep between the filament or wire surfaces is brought about, transforming into heat by friction effect part of the mechanical work imparted to the cable. As a result, a notable hysteresis in the load and unloading cycle will be found. However, from the "heat" standpoint such phenomenon is practically negligible.

In other words, the outer surfaces of the individual filaments or wires will restrain the deformation movement imparted thereto by mutual creeping, thus coupling with their resilient deformation the effects of a spring with those of a shock absorber.

Vibration dampening supports, wherein cable lengths are restrained by mechanical clamping members, are already known.

Instead, in accordance with the presently disclosed method, a further object of the present invention, is the anchoring of cable lengths by smelting or die-casting in the supporting members, remaining embedded therein.

As to known supports, the supports mode by the method of the present invention have a greater compactness since the smelted portion is intimately concerned with and entirely clamps the embedded cable lengths with an even strength on the entire surface thereof; on the contrary, a mechanical means presses more or less according to pressure direction, unevenesses of clamping members, and even slightest variations in the cable diameter.

Thus, there results according to the method of the present invention a constancy in the elastic efficiency and, in addition, an improvement in the vibration dampening and shock-resistant characteristics, also as a result of the different nature of the materials being used. A remarkable decrease in the manufacturing costs and a considerable life increase are also achieved.

In addition to this, when the cable lengths are embedded into plastic supports, a good electrical insulation and a more intimate damping of mechanical vibrations are to be added to the realization of the foregoing advantages.

On the basis of the above disclosed teaching of principles, the method of making the vibration dampening support as an object of the present invention is characterized by providing two parallel bars, preferably of plastic material, into which the ends of cable lengths, preferably metal cable, are embedded.

According to the method of making an embodiment, the cable is arranged between the supporting bars in the form of a coil, whilst according to the method of making a further embodiment said cable instead is arranged in the form of a cylindrical spiral.

In addition, the present invention comprises a method for making a vibration dampening and shock-resistant support as above cited, wherein the cable is fixed to the supporting bars in the form of a coil.

Figure 4:
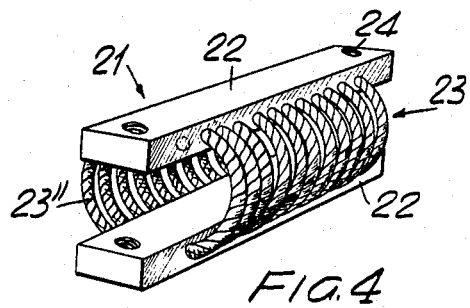
Figure 5:
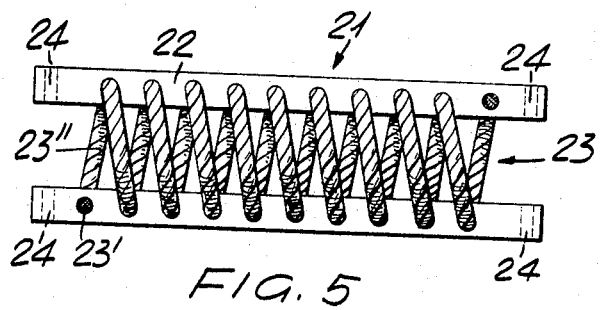

The accompanying drawing schematically shows, by way of a nonlimitative example, some embodiments of the present invention, namely:

FIG. 1 is a partially sectional, front view of an embodiment for the vibration dampening support;
FIG. 2 is a similar front view of a further embodiment;
FIG. 3 is a side view of the support of FIG. 2;
FIG. 4 is a perspective view of a further embodiment;
FIG. 5 is a side view of the vibration dampening support of FIG. 4;
FIG. 6 is a perspective view of the device for forming the vibration dampening support in accordance with the object of the present invention;
FIG. 7 is a plan view of the device of FIG. 6 during a stage of the manufacturing method;
FIG. 8 is another plan view of the device of FIG. 6 during a subsequent stage of said manufacturing method;
FIG. 9 is a front view of a clamp holder clamping the cable in form of a coil before subjecting it to the die-casting to embed the loop ends into the supporting bars; and
FIG. 10 is a partial sectional view of a structural detail.

Particularly referring to FIG. 1, the vibration dampening support 1 is shown as being comprised of two parallel side bars 2 between which a substantially coil-shaped cable 3 is fixed. The free lengths 3' of said cable 3 are rectilinear, parallel to each other, and normal to bars 2, whilst the curved lengths 3" (with the immediately adjacent zones thereto) are embedded in bars 2. The latter are made of plastic material, preferably of polyamide resin.

Cable 3 is of a multiple-stranded element type, and the stranded elements are preferably spirally arranged, and each of them is in turn formed of individual filaments or wires or of smaller stranded elements also spirally wound.

Such cables are characterized by a high internal friction and, as above stated, owing to said friction, shock and vibrational energy are dissipated to a great extent.

According to the invention any kind of cable may be used, but preferably cable 3 is a metal cable, particularly a stainless cable of the kind often being used to drive the control surfaces of aircraft.

It is to be appreciated that the coefficient of elasticity of cable 3 is equal or nearly equal to that of the material of which bars 2 are made.

As seen from FIGURE 1, both bars 2 of vibration dampening support 1 have at each end thereof a hole 4 for facilitating support fastening by allowing passage for bolts, or the like.

FIGURES 2 and 3 show a structural embodiment, according to which vibration dampening support 1' has cable 13 also arranged in a coiled manner between bars 2, but with curves 13" emerging from bars 2; the arrangement being such that only straight lengths of cable 13' are embedded in bars 2.

Further in accordance with the above cited principles of teaching, FIGURES 4 and 5 show a further embodiment of the support object of the present invention.

It will be seen from such figures that vibration dampening support 21 is comprised of two parallel side bars 22 between which a substantially cylindrical spiral cable 23 is arranged, said bars being arranged at two diametrically opposite generatrixes of said cylindrical spiral.

Thus, cable 23 has lengths 23' embedded within bars 22 by die-casting process, as above stated, and further lengths 23" that are free and provided between said bars 22.

The above described supports are mounted between the apparatus to be suspended and the base, generally in units comprising a plurality of supports allowing apparatus to be moved relative to the base according to the three orthogonal planes.

In the case of supports 1 and 1', stress is generally a shearing-bending stress, whereas in the case of supports 21 stresses may be of compressive, tensive, or shearing-bending type.

It is apparent that in the supports made by the method in accordance with the object of the present invention, cable diameter, distance and number of cable lengths between one bar and the other, as well as distance and length, may be varied in order to accommodate the same to usage requirements. By suspensions carried out with said supports, it is possible both to suspend vibration producing apparatus to avoid vibrations to be transmitted to the base, and to suspend particularly delicate operating apparatus from a base being subjected to shocks or or vibrations.

The coefficient of transmission, as to shocks, attainable by use of the supports made by the method in accordance with the object of the present invention is unusually low, in the range, for instance, of .003 and .004.

From the foregoing, it is thus evident that the vibration dampening supports made by the method in accordance with the object of the present invention are representative of sensible progress in the technique of the art and allow achievement of results unattainable by known supports.

As above stated, the present invention also comprises a method for making vibration dampening and shock-resistant supports according to FIGURE 1.

Such device is shown in FIGURES 6, 7 and 8; as seen from such figures, device 101 comprises a base 102, carrying a parallelpiped plate 103 integral or in one piece therewith, said plate being provided with two cylindrical holes passing therethrough normally to the major faces thereof, and within which two cylindrical guides 105 and 106, integral and normal to a further also substantially parallelpiped plate 104, are suitably slidable.

Said sliding is carried out by rotation of an adjustment screw 108, an outer end of which is provided with crank 109, and the other threaded end of which rotates within a female thread of a cylindrical cavity centrally in plate 103, whilst its also threaded median portion rotates within a female thread of a cylindrical hole passing centrally through plate 104 in a direction normal to the major faces thereof.

Plate 104 moves to or away from plate 103, always being parallel thereto, according to rotation of crank 109 and screw 108 in either direction; positioning of the two plates 103 and 104 relative to each other is promoted by two cylindrical spiral springs 110 and 111 carried by guides 105 and 106, respectively, and located between disc-shaped elements 125 and 126 and outer face 103' of plate 103, the disc-shaped elements being secured to the threaded ends of guides 105 and 106 by nuts 127 and 128, respectively.

On the upper side, plate 103 carries a plurality of cylindrical spokes 113 arranged along a line parallel to its edges; similarly, plate 104 carries on the upper side a plurality of cylindrical spokes 114 arranged along a line parallel to its edges. Said groups of spokes 113 and 114, thus being parallel to each other, are arranged in an offset fashion so that each spoke of one plurality is at the middle of the interval between two spokes of the other.

In addition, plate 104 carries two jaws 130 and 131 on the upper and side portions thereof, said jaws being, respectively, the fixed jaws of the clamp holders indicated as a whole, at numerals 115 and 117, respectively, the movable jaws of which are respectively indicated at 133 and 134 and slide on screws 135 and 136, said screws being driven by handwheels 137 and 138, respectively.

Inwardly and on the upper side, plate 103 has throughout its length an L-shaped groove 123; similarly, inwardly and on the upper side, plate 104 has an L-shaped groove 124, also continuing with identically shaped grooves 139 and 140 in jaws 133 and 134, respectively.

When the inner faces of plates 103 and 104 adjoin, distance between vertical walls of grooves 123 and 124 will be less than length of cable segments that, support being completed, are desired to be free between the plastic bars, as hereinafter described in more detail.

Diameters and distances between spokes of the two groups of spokes 113 and 114 may be varied according to the desired features for the completed support and thence for the metal cables being used for this purpose.

With the description further directed to the method for making vibration dampening supports, said method also comprises features in accordance with the present invention, for which operation of the above device will now be disclosed.

Said method comprises the following steps:

(1) Plates 103 and 104 are caused to adjoin along the inner faces thereof. Thereafter, a preferably steel cable length 120 is blocked at an end thereof to plate 104 by clamp holder 117 and arranged in a coiled manner by winding it about plural group location of spokes 113 and 114; this is accomplished at first on a spoke 114, then on a spoke 113, and so on until clamp holder 115 is reached, by means of which the other end of cable 120 is blocked to plate 104. During this step, distance between the vertical walls of grooves 123 and 124 will be, as above stated, less than length of cable segments that are to be exposed on completion of the shock absorber.

(2) By actuation of crank 109, screw 108 is caused to rotate within the corresponding female threads of plates 103 and 104 so as to space them apart as far as possible, and, as a result, to space the group of spokes 113 from the group of spokes 114; thus, cable segmental lengths 120, comprised between said two groups of spokes, are strained.

(3) A plate 141 (FIGURE 10) is introduced into the recess provided collectively by combination of grooves 123 and 124, said plate being below the parallel segmental lengths of cable 120. On its upper side, said plate carries a plurality of parallel semi-cylindrical grooves 161 (FIGURE 10), within which the central zones of the above mentioned parallel segmental lengths of cable 120 are caused to be partially housed. Above plate 141, a further plate 142 similar to plate 141 is placed, said plate also having on the bottom face a plurality of parallel semi-cylindrical grooves disposed to correspond with the grooves of plate 141, so as to surround as a whole the central zones of the above mentioned parallel segmental lengths of cable 120.

By means of screws 143 threaded into holes 162 of plate 141, plate 142 is clamped on plate 141, and thus the central zones of the parallel segmental lengths of cable 120 are rigidly clamped.

It is to be noted that width of plates 141 and 142 is kept equal to length of cable segments that are desired to be free between the plastic bars on completition of shock absorber.

(4) Plates 103 and 104 are moved again relative to each other, and the so obtained piece, indicated as a whole at 1 of FIGURE 1, is slipped of spokes 113 and 114.

(5) Said piece 150 is introduced into a die form, and by a die-casting process curved lengths 151 of cable 120, projecting from the sides of the mutually clamped plates 141 and 142, are embedded within two plastic bars being formed in the die form.

(6) The piece being made in cast or stamped form, plates 141 and 142 are removed by unscrewing of screws 143, and support 101, shown in FIGURE 1, is thus completed.

As seen, it has the flexible portion formed of lengths of metal cable 3' comprised between the plastic bars 2; said cable lengths 3' are thus the lengths of cable 120 previously clamped by plates 141 and 142.

In addition to the above, other expedients may be provided to improve the support, device and method according to the invention, without departing for this from the protective field of the present invention.

Particularly, each of the two parallepiped plates, forming a part of the device, in lieu of carrying a plurality of spokes on the upper part, may carry a plate in turn carrying said plurality of spokes, securable to the plate by any known system, and this spoke mounting on the plates would be provided to facilitate interchangeability of the plurality of spokes. The above modification also maintains the position of the two groups of spokes in mutually advantageous relationship with each other.

In addition, the device according to the present invention and for simplification of a manual operation, may be connected to a hydraulic or pneumatic system having related controls so as to achieve automation.

What is claimed is:

1. A method for making vibration dampening and shock-resistant supports comprising; arranging a pair of plates in spaced parallel relation with each plate having pins projecting from one edge, clamping the end of a steel cable to one end of one plate, winding the cable back and forth around said pins, clamping the cable to the other end of said one plate, moving the plates away from each other to stress the cable between said pins, clamping the cable lengths extending between said pins fixedly in place while simultaneously completely enclosing the intermediate portions of said lengths, removing the clamped cable from the plates, placing the clamped cable in a die with the portion of the cable other than said enclosed portion thereof disposed in cavities of the die, casting synthetic material in said cavities, and enclamping said intermediate portions of said cable.

2. A method for making vibration dampening and shock-resistant supports according to claim 1 in which said synthetic material is a polyamide resin.

References Cited

UNITED STATES PATENTS

| 1,630,839 | 5/1927 | Fisher et al. | 264—228 |
| 2,634,167 | 4/1953 | Bible | 264—277 |
| 3,023,475 | 3/1962 | Yerby et al. | |
| Re. 24,914 | 12/1960 | Koenigsberg | 264—251 |
| 2,372,950 | 4/1945 | Holmberg et al. | 264—261 |
| 2,873,109 | 2/1959 | Hartenstein et al. | 248—358 |
| 3,065,959 | 11/1962 | Kerley et al. | 267—1 |
| 3,204,911 | 9/1965 | Lawrence et al. | 248—358 |

ROBERT F. WHITE, Primary Examiner

K. J. HOVET, Assistant Examiner

U.S. Cl. X.R.

25—118; 254—29.5; 264—251, 261, 278